United States Patent [19]
Anderson

[11] 3,772,909
[45] Nov. 20, 1973

[54] APPARATUS FOR ANALYZING ENVIRONMENTAL GASES

[75] Inventor: Weston A. Anderson, Palo Alto, Calif.

[73] Assignee: Varian Associates,, Palo Alto, Calif.

[22] Filed: Aug. 2, 1971

[21] Appl. No.: 168,239

Related U.S. Application Data

[63] Continuation-in-part of Ser. No. 707,613, Feb. 23, 1968, abandoned.

[52] U.S. Cl. .................................................. 73/23.1
[51] Int. Cl. ........................................... G01n 31/08
[58] Field of Search ................... 73/23, 23.1; 55/16, 55/158

[56] References Cited
UNITED STATES PATENTS
2,972,246  2/1961  Reinecke et al. ...................... 73/23

3,087,112  4/1963  Pfefferle .............................. 324/33
3,421,292  1/1969  Llewellyn .............................. 55/158
3,443,416  5/1969  Webb .................................. 73/23.1

Primary Examiner—Richard C. Queisser
Assistant Examiner—Stephen A. Kreitman
Attorney—Stanley Z. Cole

[57] ABSTRACT

A chromatographic system is disclosed which enables the analysis of an ambient or other gaseous medium using the gaseous medium itself, in a purified form, as the system carrier fluid. Ambient gases are continuously drawn into the system and a semi-permeable membrane type separator is used to purify the gas for use as a carrier fluid and to simultaneously provide a source of concentrated ambient impurities, a sample quantity of which is later interjected into the carrier flow stream at the input to the column.

8 Claims, 5 Drawing Figures

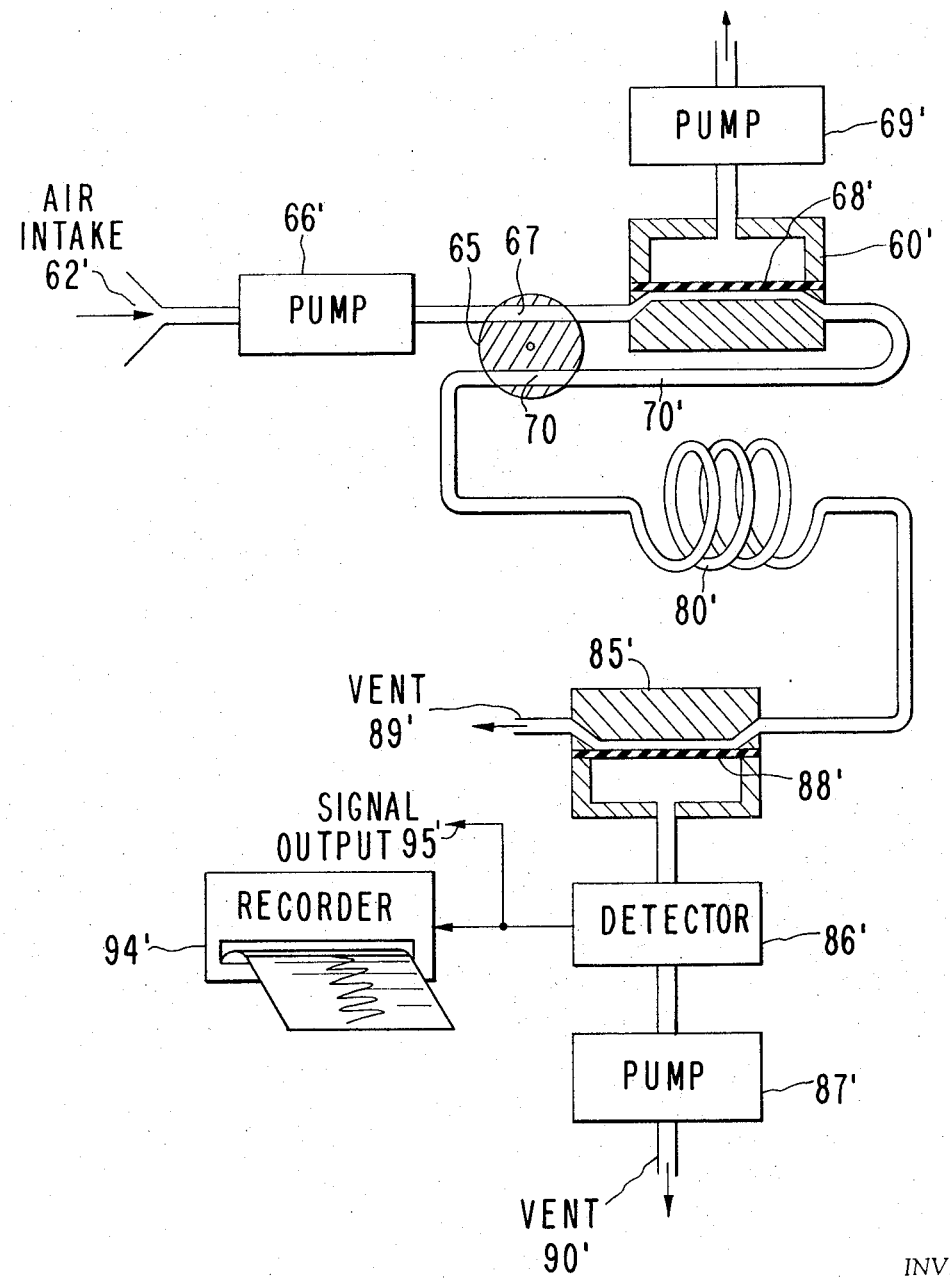

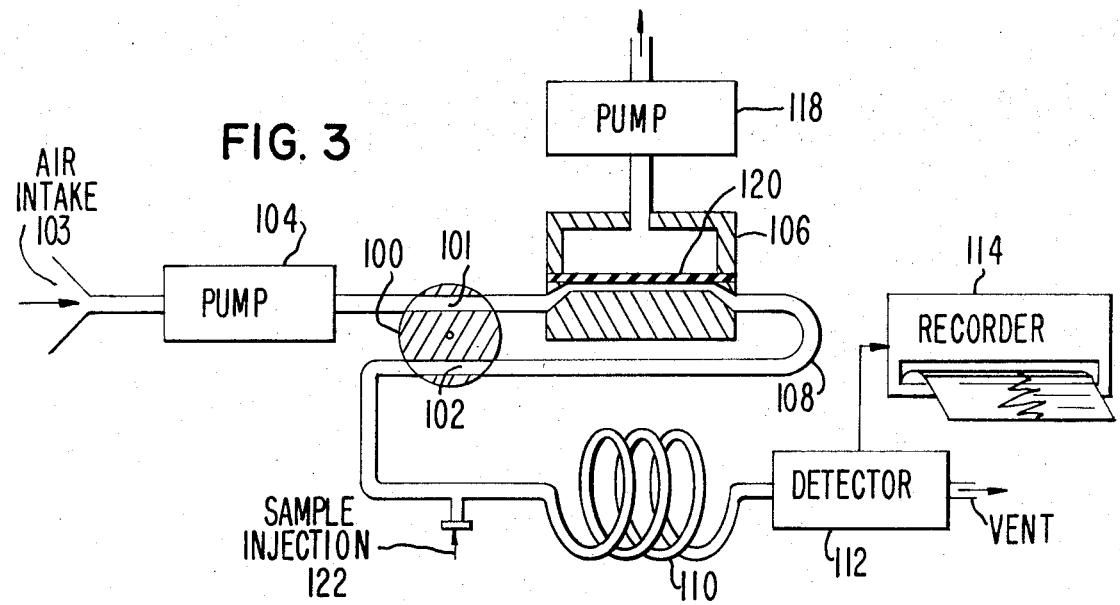
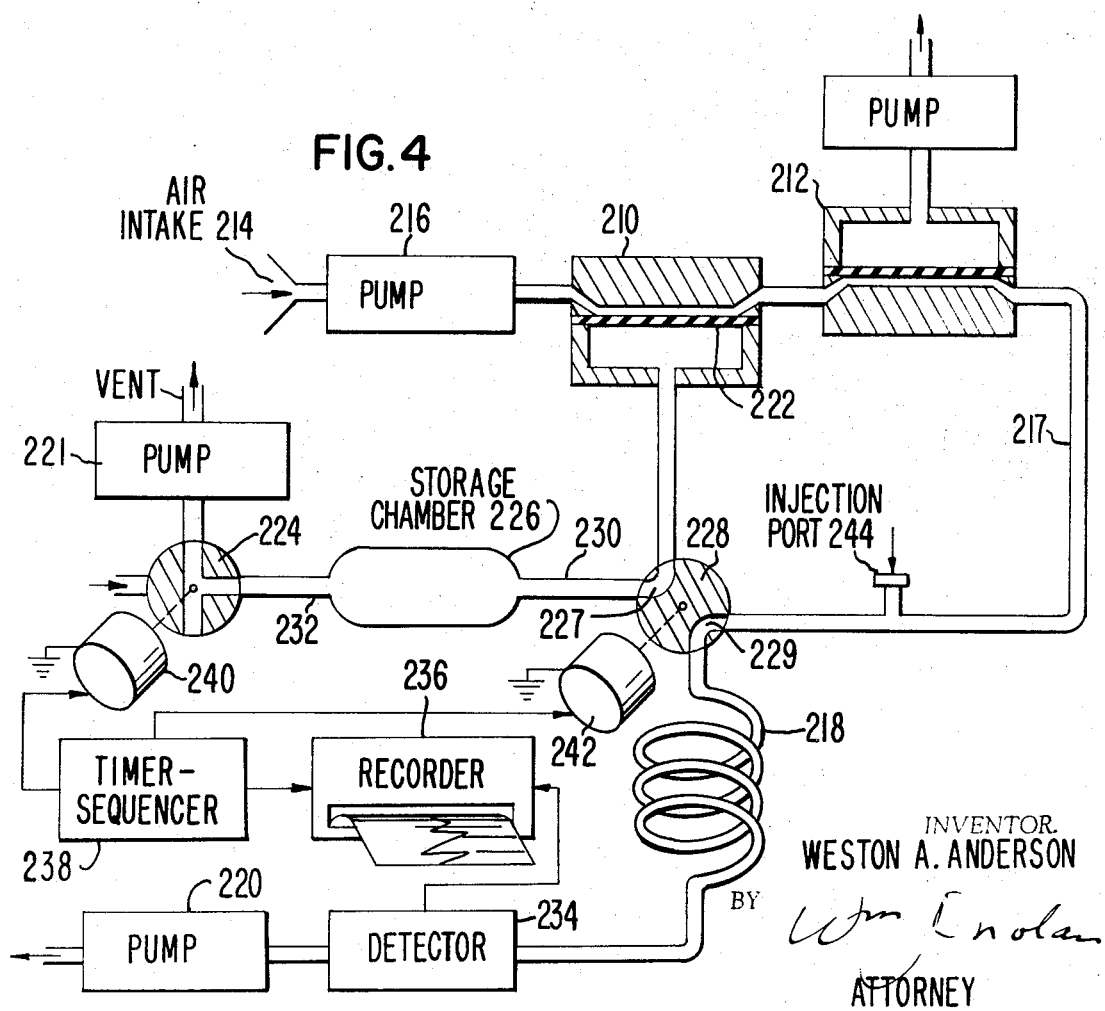

APPARATUS FOR ANALYZING ENVIRONMENTAL GASES

RELATED APPLICATIONS

This application is a continuation-in-part application of parent application Ser. No. 707,613 filed 23 Feb. 1968 and assigned to the same assignee as the present application, now abandoned.

The present invention relates in general to apparatus for providing chromatographic analysis of a gaseous state material. More particularly, the invention relates to an apparatus which permits the use of ambient air as the carrier medium in the chromatographic separation of constituent gases in a particular sample material. Similarly, the invention relates to an apparatus which uses air as the carrier medium and permits the analysis of the contaminants in the ambient medium.

Gas chromatography is the field of analytical instrumentation which involves the separation of various compounds, materials, mixtures and the like which comprise a given quantity of gaseous state material. The component gases of an unknown mixture are usually separated by using a carrier gas to transport a sample of the mixture through a chromatographic column filled with a pulverant or porous mixture which retards to different degrees the passage of the several constituent gases making up the mixture. The component gases of an injected sample are thus separately eluted from the output end of the column, spaced in time, and may thereafter be detected and analyzed by suitable quantitative and/or qualitative analytical instrument means.

The permanent gases are typically used as carrier gases although air has been used under certain circumstances. However, the source of air which has been used in the past has typically been a compressed, precollected and purified quantity more commonly referred to as a "bottle of compressed air." If the air is not purified and free of moisture the accuracy of the analysis would obviously depend on the amount of moisture present as well as the ratio of air impurity to sample if the air included any of the constituent elements of the sample. It is therefore apparent that any ambient air used as a carrier medium must be dry and must have the impurities removed or they may contaminate the column and/or appear as a baseline in the detector output which will change as the impurity level changes. Furthermore, it may be desirable in some cases to detect impurities in the ambient media, and this cannot be done unless the same impurities are removed from the carrier gas.

Notable among the prior art air pollution measurement devices utilizing gas chromatographic principles is the apparatus disclosed in U. S. Pat. Nos. 3,027,241 and 3,366,456 to Andreatch et al. This system, however, requires the use of a bottled quantity of purified gas as the fluid carrier medium and fails to depart from known prior art chromatographic practices in this respect.

Heretofore, no practical chromatographic system has been provided which would enable the induction of unpurified air directly into the system for use as the carrier fluid. It is therefore a principal object of the present invention to provide a gas chromatographic system wherein ambient gas or air can be used as the fluid carrier medium, the gas being purified by a first membrane separator to provide a carrier, the sample being inserted into the purified carrier and passingg to a second membrane separator wherein the material of the membrane is the same as the material of the membrane of the first separator, the second separator separating out only those components from the sample similar to those components separated out from the ambient gas by the first separator.

Another object of the invention is to provide a system of the above-recited type wherein the sample inserted into the purified carrier is a sample of the ambient gas being supplied to the first separator.

Another object of the invention is to provide a gas chromatograph system wherein ambient gas or air is used as a fluid carrier medium, the gas being purified by a membrane separator to provide a carrier gas to the chromatograph column, the portion of the ambient gas separated out by the separator being stored, and means for inserting a volume of the separated out portion of the gas into the carrier gas between the separator and the column.

These and other objects of the invention will become apparent upon a reading of the following detailed specification and the appended drawing wherein:

DRAWING

FIG. 1 is a schematic diagram of a gas chromatographic system in accordance with the present invention, FIG. 2 is a schematic diagram of a gas chromatographic system in accordance with the present invention, FIG. 2A is a schematic diagram of a modified form of the system of FIG. 2, FIG. 3 is a schematic diagram of an atmospheric analysis gas chromatographic system in accordance with the present invention, and FIG. 4 is a schematic diagram of an atmospheric analysis gas chromatogqaphic system including automatic sampling control apparatus in accordance with the present invention.

DETAILED DESCRIPTION

In accordance with the present invention a chromatographic system is disclosed wherein a semipermeable membrane type separator, such as is disclosed in U. S. Pat. No. 3,455,092 issued July 15, 1969, is disposed between an air intake port and a chromatographic column input. As disclosed in the aforementioned patent, membranes constructed of polymers and stationary liquid phases are characterized as being free of holes such that gaseous state materials can pass through the membrane only by diffusion. In order to diffuse through the membrane the gaseous state material must first be captured by the membrane either by entering into solution therewith or by physically adhering thereto. Most gases and gaseous state materials with the exception of air and the permanent gases are readily captured by the membrane at elevated temperatures and a pressure differential established across the membrane will cause the gaseous materials to diffuse through the membrane to the low pressure side.

In the subject apparatus the fluid path across the surface of the membrane is dimensionally restricted in the direction normal to membrane such that due to random molecular movement there is an extremely high probability that all of the molecules of the gaseous material will collide with the membrane during their traverse across the surface and be captured thereby. Since air and the other permanent gases used as carrier fluids have a very low capture rate they will in effect continue to pass across the surface of the membrane and out through the separator exit port while the other gaseous state materials will be captured and caused to diffuse through the membrane. Suitable separator apparatus of the type described have been found capable of separating the non-permanent gaseous state materials from the permanent gases to a degree exceeding 99 percent. Therefore, in accordance with the present invention a system will be disclosed which enables the use of ambient air, absent its impurities, as a carrier fluid in place of the expensive permanent gases normally used.

Figure 1:
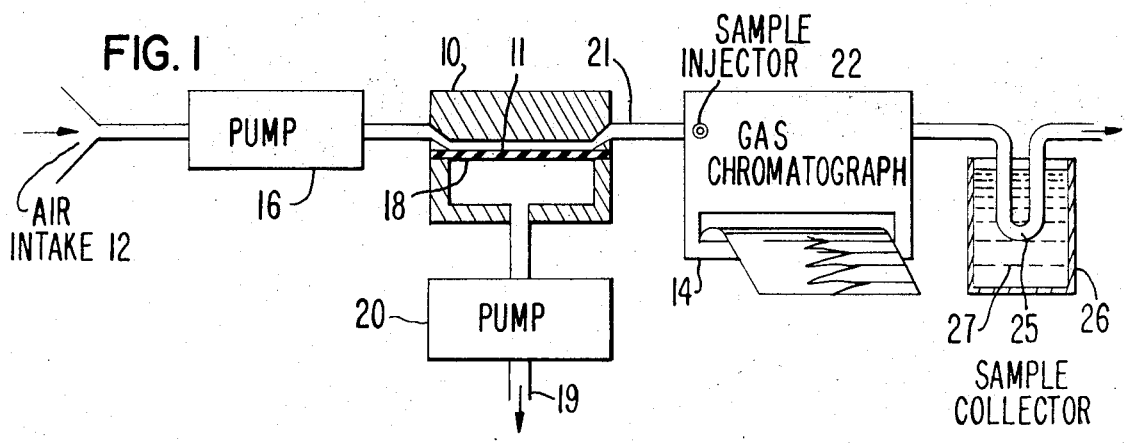

Referring now to FIG. 1 of the drawing, a combination quantitative-qualitative system is shown in accordance with the present invention wehrein ambient air may be used as the carrier gas. A semi-permeable membrane type separator 10 is disposed between air intake port 12 and a gas chromatograph 14. A pump 16 is provided between the ambient intake port 12 and the separator 10 for raising the pressure of the inducted air to adove atmospheric pressure so as to cause a continuous flow through passage 11 of the separator 10 to the input of the gas chromatograph 14. The dimension of the passage 11 in the direction normal to the surface of the membrane 18 is preferably small enough so that the probability of total molecular collision of the gas molecules with the membrane is high.

A second pump means 20 is provided for causing a pressure differential across the membrane 18 of the separator 10 so that the materials entering into solution with the membrane 18 will diffuse therethrough and be exhausted out of the vent 19. The gaseous fluid (purified air) which is not captured by the membrane exits through port 21 of the separator 10 and is then suitable for use as a carrier gas in the chromatograph 14. A sample injection port 22 is provided at the front end of the gas chromatograph 14 so that a sample material can be injected into the fluid flow path of the gas chromatograph 14 for analysis.

In operation the pump 16 causes ambient air to be drawn in through the air intake port 12 and to be passed through the passage 11 across the surface of the membrane 18 of separator 10 and then into the gas chromatograph 14. As the ambient air flows across the membrane 18 the impurities in the air are captured by the membrane 18 by entering into solution therewith. As the impurities diffuse through the membrane 18 they are exhausted from the system by the pump 20. The air which passes through the separator 10 is thus substantially free of impurities and is now suitable for use as a carrier gas in the gas chromatograph 14.

A sample injected at port 22 will be carried into the column of chromatograph 14 to be separated and quantitatively analyzed. As the separated peaks are eluted through the column of the chromatograph they are passed into a detector also located in chromatograph 14, or collected into a sample tube 25 which may be cooled by a dewar 26 containing a coolant 27. The signals from the detector may be recorded, stored on paper or magnetic tape, or may be processed further and used as control signals.

The gas chromatograph 14 may be a single column gas chromatograph such as the Varian Aerograph Hy-Fi III or it may be a dual column chromatograph such as the Varian Aerograph Model 205.

Figure 2:
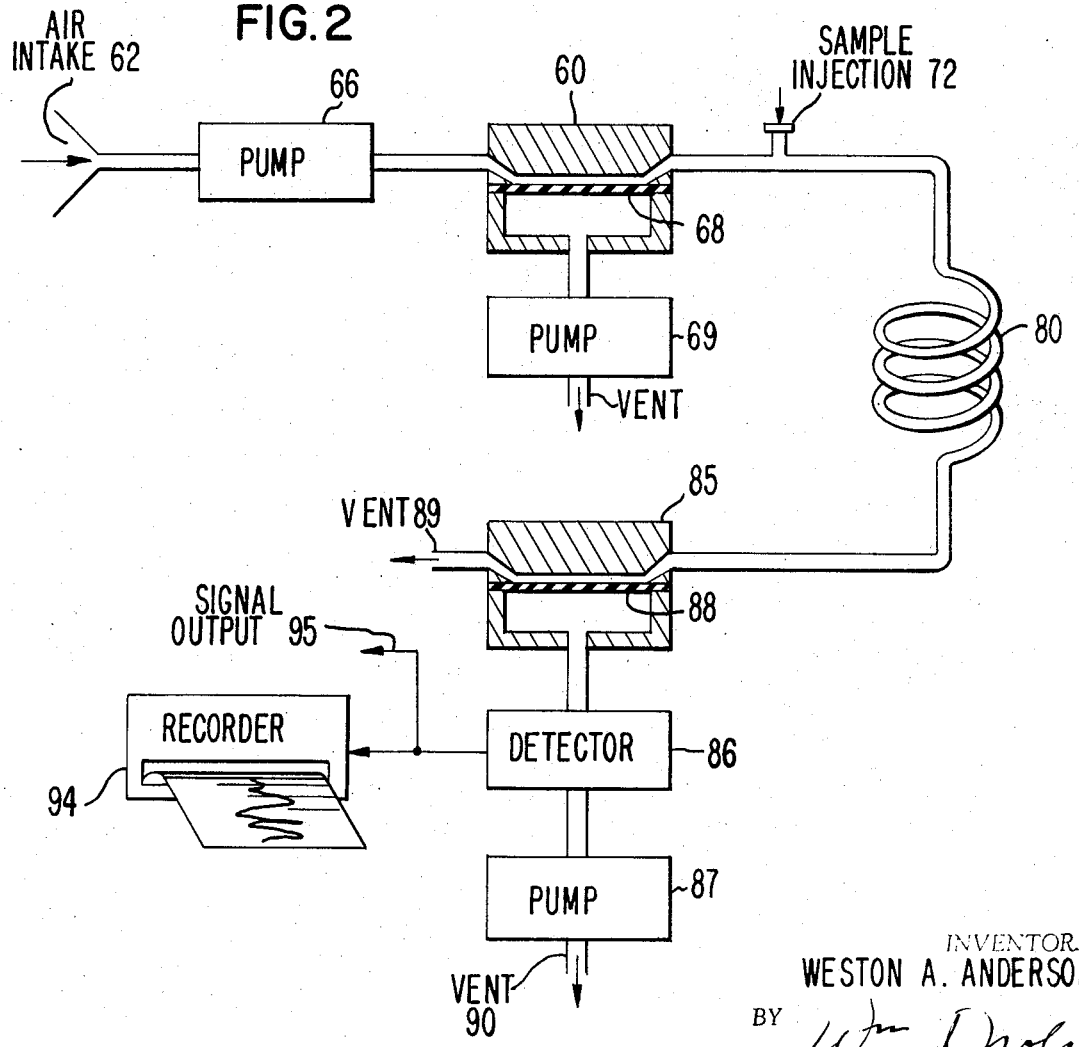

In another embodiment of the subject invention shown in FIG. 2 the output of the separator 60 is fed into a gas chromatograph system consisting of the sample injector 72, column 80, separator 85, detector 86 and pump 87.

As the ambient air is drawn through intake 62, pump 66, and into separator 60 the impurities are removed by diffusion through membrane 68 and are exhausted through pump 69. The air free of impurities is then passed by the sample injection port 72 where sample materials to be analyzed by the chromatographic system are introduced. The sample carried by the purified air stream is then carried through the gas chromatographic column 80 where the various components of the sample material are separated in time because of their differences in retention times. The eluted materials then pass into separator 85 where the ambient air which is used as the carrier gas flows across the membrane 88 and into the atmosphere through vent 89. The organic components of the sample materials are soluble in the membrane material 88 and pass through the membrane 88 and into the detector 86. The materials are then removed from the detector by pump 87 and may be vented or collected as desired at the pump output 90. The signal voltage from detector 86 may be recorded by recorder 94 or some other recording or controlling device may be connected to the detector output 95.

By way of example, the detector 86 may consist of a thermal conductivity gauge, a vacuum pressure gauge, or a mass spectrometer. A dual stage system may be used in place of separator 85 as is described in U. S. Pat. No. 3,429,105 issued Feb. 25, 1969.

In a preferred emboiment, the membrane 88 is made from the same material as the membrane 68, e.g., dimethyl silicone, so that all components which pass through membrane 88 are the same type of components that will also readily pass through membrane 68 and have been removed from the air before passing through the column 80. By using the same material for the two membranes 68 and 88 the special advantage is achieved of removing from the carrier gas those same components to which the detector system comprising separator 85 and detector 86 are sensitive. This eliminates very troublesome interference in detector 86 from material in the carrier gas as contrasted to components from the sample injection. Thus, only components that are injected into sample injector port 72 and which are eluted through the column 80 and which have the property of passing through membrane 88 are detected and recorded on recorder 94.

In some requirements it is desirable to inject a fraction of the intake air and pass it through column 80 to obtain an indication of certain impurities or materials that may be present in the air. This is accomplished in the apparatus of FIG. 2A. A two-position valve 65 is placed in the lines leading to and from the first separator 60'. With the valve in the position shown, the intake air passes through valve passage 67 and then over the membrane 68' of the separator 60' and the components passable through the membrane 68' are removed from the air as it passes through the second passage 70 of the valve and on to the column 80' and second membrane separator 85'. The fraction sample of intake air is obtained by rotating the valve 65 through 180° so that the incoming air then in passage 67 is moved down into the line 70' positioned between the output of the first separator 60' and the column 80'. This slug of air thus bypasses the first separator and moves to the column while sandwiched between volumes of air that have been purified by the first separator 60'. There are no components in the air volumes on either side of the air sample slug that will pass through membranes 88' since they were removed by membrane 68'. Only those type components in the air sample slug will pass through the membrane 88', these components having been first separated by the chromatograph column 80'.

This apparatus may be used for the detection of molecular components in air that are indicative of certain explosives. For example, a stick of dynamite emits vapors that contain nitoglycerin and ethylene glycoldinitrate. These components are found in the neighborhood of the dynamite in concentrations over the range of one part in $10^7$ to one part in $10^{10}$. With the system described in FIG. 2A these molecular components are detected by their elution times from the gas chromatograph column, thereby detecting the presence of dynamite. In another application one may detect the presence of drugs or drug metabolites on the breath of a person. The breath is sampled by the air intake 62' and valve 65, and the drug components or metabolites are identified by their elution times in the gas chromatograph. In some cases it is desirable to have a mass spectrometer as part of the detection system. Alcohol on the breath is a relatively simple molecule that can be detected and identified, and such an apparatus is useful in determining the blood alcohol level in that individual.

In another embodiment of the subject invention shown in FIG. 3, a valve means 100 having flow passages 101 and 102 is inserted between an intake pump 104 and a membrane separator 106. The output of the separator 106 is returned through a conduit 108 and passed through flow passage 102 of the valve means 100 and then to the input of chromatographic column 110. At the output of the chromatographic column 110 a detector 112 is provided for detecting the sample peaks as they are eluted from the column 110 and a recorder means 114 is provided for recording the output of the detector 112.

As the ambient air is drawn through intake 103, pump 104 and the passage 101 of valve 100 into the separator 106, the impurities are removed by diffusion through membrane 120 and are exhausted through pump 118. The air free of impurities is then passed through passage 102 of valve 100 and into column 110. At this point it will be recognized that the air which is flowing through valve passage 101 contains the ambient contaminants while that flowing through passage 102 is free of contaminants. By rotating the valve spool out of alignment with the flow streams a quantity of air containing the ambient contaminants will be trapped in the passage 101. If the valve 100 is then rotated a full 180° from its initial position, the impurities trapped in the passage 101 will be inserted in the pure air flow path between separator 106 and column 110. This slug of impure air will therefore be introduced into the column 110 just as if it had been injected in the normal manner. The column 110 will then separate the constituents of the contaminated sample of air and the recorder will produce a record of these impurities. The valve 100 thus provides a means for selectively introducing samples of contaminated air into a flow stream of purified air such that the purified air acts as a carrier fluid for each sample as it is passed through column 110. A sample injection port 122 may be provided between the separator 106 and the column 110 so that the system may also be used to analyze other sample materials using air as the carrier gas.

In FIG. 4 there is shown a still further embodiment of the invention wherein a pair of membrane type separators 210 and 212 are provided between an air intake port 214 and a chromatographic column 218. A pump means 216 is provided at intake 214 to force air through the separator 210 and 212 and into column 218. In addition, another pump 220 may be used to assist the pump 216 in maintaining a flow through the system or, alternatively, pump 220 may be used in place of pump 216 whereby the air intake 214 is connected directly to the separator 210.

A third pump means 221 is provided for reducing the pressure on one side of the membrane 222 of the separator 210. The pump 221 is connected to the separator 210 through a valve means 224, storage chamber 226 and flow passage 227 of a second valve means 228. The flow path between separator 212 and column 218 passes through a second passage 229 of valve 228.

When the valve 224 is in the position shown, the pressure on one side of the membrane 222 of separator 210 is reduced such that contaminants captured in passing across the opposite side of the membrane 222 are caused to diffuse through the membrane and to be drawn into storage chamber 226 through valve means 228. The impurities will thus be continuously stored in the chamber 226.

The second separator 212 provides further separation of impurities from the air flow stream so that the air passing through conduit 217 to column 218 is maintained substantially free of impurities and suitable for use as a carrier gas.

If valve means 224 is now rotated by 90° clockwise, the pump 221 will be disconnected and due to the lower pressure in the storage chamber 226 air will be drawn through valve 224 into the storage chamber 226 compressing the gaseous impurities stored in the storage chamber into a much smaller volume in the conduit 230 and the flow passage 227 of the valve 228. If the valve 228 is subsequently rotated counterclockwise by 180° such that valve passage 227 now occupies the previous position of valve passage 229 and vice versa, the compressed gas trapped in passage 227 will now be introduced into the purified air stream flowing in conduit 217 between separator 212 and column 218. This slug of air with an enhanced impurity level will therefore be introduced into the column 218 just as if it had been injected in the normal manner. The column 218 will then separate the constituents of the contaminant sample of air and these constituents will be detected by detector 234 and recorded by recorder 236.

After the air sample has been introduced into the air stream by the rotation of valve 228 the valve 224 may be returned to its original position so that the storage chamber is re-evacuated.

The sequence of the valve operation may be manually controlled or may be automatically provided by a timer-sequencer 238 which controls the operation of the valves in the sequence described above, and in addition may be used to either start the recorder 236 or to apply a starting time mark to the recorder 236. The timer-sequencer 238 may be selectively programable to cause the system to sample at any predetermined interval.

This embodiment of the invention provides an automatic means for repetitively sampling and quantitatively analyzing ambient air and providing a continuous record thereof. In additon, this embodiment provides for increased system sensitivity by concentrating the impurity level of the sample introduced into the flow stream.

In order to add versatility to the system a sample injection port 244 may also be provided between the separator 212 and column 218 to enable analysis of other materials or the simultaneous analysis of ambient impurities and other gaseous materials.

It should perhaps be mentioned that I contemplate the use of my apparatus in any suitable environment and with any suitable means for introducing additional contaminants into the ambient medium. For example, the intake port may be modified so that human breath can be introduced into the intake flow stream so as to enable the device to be used as an alcoholic toximeter or other breath analyzing device. As another example, the intake apparatus may be adapted for connection into the air return plenums in hospital heating and air conditioning systems or the like for monitoring the level of certain pollutants in the hospital proper or any part thereof.

The far-reaching utility of the invention described above will be obvious to those skilled in the art of gas analysis. Among the many uses to which the invention will find application at least the following are contemplated: smog analysis; internal combustion engine exhaust analysis; furnace effluent analysis; mineral prospecting; crop growth monitoring; pest growth and influx monitoring; mine gas monitoring; and many other areas in which a phenomenon can be related to an ambient gas condition.

Although many alterations and modifications of the invention will be apparent to those of skill in the art after having read the foregoing specification, it is understood that this description is for purposes of illustration only and is in no manner intended to be limiting in any way, and I intend that the appended claims be interpreted as covering all modifications which fall within the true spirit and scope of my invention.

What is claimed is:

1. An analytical apparatus for analyzing the gases present in an ambient medium said apparatus comprising:
   a semi-permeable membrane type separator for removing gaseous state contaminant materials from an ambient gaseous mixture passed therethrough,
   means for causing said ambient mixture to be passed through said separator,
   gas chromatographic column means connected in fluid flow relation to said separating means such that gaseous material free of contaminants is caused to pass through said column means,
   means connected to said separator means for collecting said contaminant materials removed from said mixture,
   and means for interjecting a predetermined quantity of said collected contaminant into the flow stream between said separator and said column means.

2. In an analytical apparatus as described in claim 1 wherein another gas separating means is connected between said membrane type separator means and said column means, and detector means are provided for analyzing the gaseous effluent of said column means.

3. In an analytical apparatus as described in claim 2 wherein recording means are provided responsive to said detector means and a programable sequencing means is provided for controlling said sample interjecting means and providing an indicating signal to said recording means.

4. In an analytical apparatus as described in claim 1 wherein said contaminant collecting means includes a vacuum pumping means and a storage chamber for temporarily storing said contaminants and for allowing a sample quantity to be introduced into the input flow stream of the column.

5. An inlet system for gas analyzing apparatus which comprises: means forming a first chamber and a second chamber, said chambers being separated by a permeable membrane, said first chamber including an inlet means and an outlet means and means for directing a flow stream of gaseous material from said inlet into communication with said membrane such that certain constituents thereof are captured by said membrane and the non-captured constituents are passed through said outlet means and into said gas analyzing apparatus the input of which is connected to said first chamber outlet means, said second chamber including an outlet port, pressure reducing means coupled to said last mentioned outlet port so as to reduce the pressure in said second chamber to a level substantially below that of said first chamber thereby causing said captured constituents to diffuse through said membrane and into said second chamber, said outlet means of said first chamber including means for interjecting a sample material into said flow stream, gas induction means coupled to said inlet means for causing a continuous flow through said separator and into said gas analyzing apparatus, and means for collecting said captured constituents and conveying said constituents to said sample interjecting means such that a portion thereof may be selectively re-introduced into said flow stream.

6. A gas analyzing apparatus comprising: a first membrane type separator including means forming a flow path across one side of a semi-permeable membrane, said flow path being disposed between an inlet and an outlet, and pressure reducing means coupled to said separator in communication with another side of said membrane for reducing the pressure on said other side so as to induce the diffusion of certain components through said membrane,
   a second membrane type separator including means forming a flow path across one side of a semi-permeable membrane, said flow path being disposed between an inlet and an outlet, and pressure reducing means coupled to said separator and in communication with another side of said membrane for reducing the pressure on said other side so as to induce the diffusion of certain components through said membrane,
   the materials of said two membranes being the same so that said certain components diffusing through said two membranes are the same components,
   chromatographic column means having an end thereof connected to the outlet of said first separator means and the other end thereof connected to the inlet of said second separator means,
   means disposed between said first separator means and said column means for enabling the insertion of a quantity of sample material into the system flow stream, ambient gas induction means connected to said inlet of said first separator means for inducing a flow stream through said apparatus, and detector means connected between said second separator means and said second pressure reducing means for detecting certain components of said sample material.

7. A gas analyzing apparatus as claimed in claim 6 wherein said means for inserting a quantity of sample material into the system flow stream includes means coupled to said ambient gas induction means for providing a volume of said ambient gas as said quantity of sample material.

8. Chromotographic method of analyzing ambient gas for contaminants using said ambient gas as the carrier gas;

drawing said ambient gas through a semi-permeable membrane separator;

directing a first output of said separator comprised of the ambient gas which did not pass through the membrane to a column as the purified carrier gas;

collecting gas which passed through the membrane;

injecting a predetermined amount of said collected gas into the column input; and passing said column output elutants to a gas detector for analysis.

* * * * *